United States Patent
Monday et al.

(10) Patent No.: US 6,604,196 B1
(45) Date of Patent: Aug. 5, 2003

(54) APPARATUS AND METHOD FOR COMPONENT ROLE FULFILLMENT BASED ON ENVIRONMENT CONTEXT

(75) Inventors: Paul Brian Monday, Rochester, MN (US); Bradley Scott Rubin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,679

(22) Filed: Aug. 18, 1998

(51) Int. Cl.[7] .................................................. G06F 9/00

(52) U.S. Cl. ........................................ 713/100; 717/108

(58) Field of Search .............................. 709/310–320; 713/1, 2, 100; 717/108

(56) References Cited

U.S. PATENT DOCUMENTS

| | | | | |
|---|---|---|---|---|
| 5,872,971 A | * | 2/1999 | Knapman et al. | 709/101 |
| 6,029,000 A | * | 2/2000 | Woolsey et al. | 717/147 |
| 6,219,787 B1 | * | 4/2001 | Brewer | 713/167 |
| 6,295,645 B1 | * | 9/2001 | Brewer | 717/11 |

* cited by examiner

Primary Examiner—St. John Courtenay, III
(74) Attorney, Agent, or Firm—Schmeiser, Olsen & Watts

(57) ABSTRACT

A method and apparatus for changing a component's mode based on its environmental context is disclosed. A component role fulfillment mechanism, as part of a component, changes the mode of a component based on its environmental context. The environmental context is defined by connections made by an assembler between components. Each component can support a variety of modes, but the component role fulfillment mechanism chooses one mode based on the environment and configures the component to fulfill only one mode.

56 Claims, 5 Drawing Sheets

APPARATUS AND METHOD FOR COMPONENT ROLE FULFILLMENT BASED ON ENVIRONMENT CONTEXT

RELATED APPLICATION

This application is related to the following U.S. patent application, Ser. No. 09/115,848, now U.S. Pat. No. 6,434,740, entitled "Apparatus and Method for Visual Construction Simplification From N to 1 Connections" filed on Jul. 15, 1998, and said application is hereby incorporated by reference.

BACKGROUND OF THE INVENTION

1. Technical Field

This invention generally relates to object-oriented programming. More specifically, this invention relates to reducing the complexity of object interfaces.

2. Background Art

The development of the EDVAC computer system of 1948 is often cited as the beginning of the computer era. Since that time, computer systems have evolved into extremely sophisticated devices, and computer systems may be found in many different settings. Modern computer systems vary in their design and architecture, with many different models available to achieve the desired combination of speed, power and efficiency for any given computing environment.

Computer systems typically include operating system software that controls the basic functions of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming, based on an object model, is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

Objects help program designers to make better products faster because objects are reusable, have defined interfaces, and are already tested. In addition, some of an object's interface (where other objects are allowed access to some of the internals of the particular object) and much of the internal workings of the object can be changed without changing the objects that use the particular object. In other words, if Object A uses Object B to perform a certain function, the way that Object B actually performs that function can be changed without any changes to Object A or without changes to Object B's interface. Because the inner workings of objects are "hidden," objects can be changed to a great degree without causing changes to outside objects. Another benefit of having the inner workings hidden is that the program designer does not need an understanding of how the object works; instead, the program designer only needs to know what the object does. In this way, the program designer can merely use the object without spending an inordinate amount of time either programming another function to perform the object's function or examining the object to see how it works.

Because of the tremendous improvement in programming simplicity and reuse provided by objects, object-oriented programming has become extremely popular. Many software companies have attempted to make objects even easier to use. For instance, to help program designers who are designing object-oriented programs, computer software manufacturers have designed certain tools to make object-oriented programming easier. One such tool is a visual compiler that shows program designers how the various objects are connected and what their interfaces are. Using these tools, program designers can simply "drag and drop" pre-made objects from a "palette" and onto a "canvas" and then connect the objects together. The visual nature of these development tools makes it relatively easy, at least for small programs, to see how the program is designed.

In addition to visual tools, software companies have begun to "package" objects. This packaging of objects can take several forms. One such form, allowed by most visual compilers, is the idea of components. Components are pre-built objects that perform various functions. The computer scientist who actually programs the component is called the "component creator," "component builder," or "developer." Both the computer scientist who programs the component and the programmer who uses the component are actually "developers"; however, to clearly demarcate who is actually creating the component, only the component builder will be called a "developer." The programmer actually using the component is called the "assembler" or "program designer." Assemblers or program designers choose the pre-designed component that meets their needs, and drop or add the component from the palette to the canvas. Assemblers can also modify the component, if necessary, to perform the assembler's desired function. In addition, assemblers can make their own components that they can then reuse at a later time. Assemblers can combine their own components or other pre-made components into a program by placing each component onto the canvas and connecting all components together.

The second form object packaging includes the use of pre-made components obtained from a software vendor. In this case, the software vendor, as the component builder, creates generic components that are applicable to many tasks and then licenses these components to software program designers. Both parties benefit from this arrangement because the assemblers get a well-defined, thoroughly tested infrastructure upon which to base their applications, and the software vendors receive an influx of money from licensing fees.

Even though visual development systems and components are tremendously useful development tools in simple environments, they suffer from connectivity problems when employed in more complex situations. When an assembler adds an object or component onto the assembler's canvas, the assembler must then connect this new object to the old objects that will be interfacing with (or to) the new object. Connections are made to provide paths for data flow between components. The paths for data flow are generally method calls, wherein one component is calling another component's method and sending and/or receiving data at the same time. The connection symbol between objects is visually represented by a line. The connectivity problem in complex environments occurs for at least two reasons.

First, the number of lines on the canvas quickly becomes so large as to partially or completely obscure the objects and components. Second, the complexity of even small designs becomes quickly overwhelming with each added component. This occurs because each component may have many connections to multiple components. Even with a relatively small number of components on a canvas, the number of interconnections between the components will be so large that the structure of the program becomes lost in the extreme number of interconnections. The program designer can no longer ascertain what the structure of the program is. The benefit of having a visual design tool that quickly shows the structure of the project is lost in the morass of connection symbols.

For instance, if the assembler is designing a program that will keep track of a company's car lots, the assembler might have a canvas having a company component, two car lot components, and import and domestic components for each car lot component. In this relatively simple program, the company component is connected to the two car lot components and each car lot component is connected to its own import and domestic component (which indicate import and domestic cars, respectively). Now assume a more realistic example, where the company owns several different car lots under various names in different states. Each car lot may or may not be affiliated with its neighboring car lot in the same state. Each car lot sells many, few, or only one brand of car. Furthermore, each of the import and domestic vehicles are divided into brands, major types of cars (e.g.—sport-utility vehicles, compacts, minivans), models, etc. Each model also has many options (e.g.—sun roof, color, fancy wheels). The assembler must interconnect all of these various properties, versions of cars, car lots, and affiliates, while also ascertaining the number of different components needed and what the interfaces for each component are. In short, the assembler must spend a large quantity of time programming and interconnecting many different components that perform different roles. In addition, each component or object adds more real and visual complexity to the assembler's program. The tasks of tracking the role of each object, connecting the objects, and tracking the overall functionality of the programming to verify that each object is correctly fulfilling the desired activities of the desired roles, can become overwhelming.

While adding functionality in the form of roles to components, is a very desirable goal, the implementations available today are overly complex and resource intensive. Without a method for reducing the complexity associated with adapting the role of components in an object-oriented programming environment, assemblers will, as a matter of course, continue to experience unnecessary limitations when programming components to operate with and accept multiple roles.

DISCLOSURE OF INVENTION

The preferred embodiments of the present invention provide a method and apparatus for changing a component's functionality or "mode" such that a given component is able to interoperate with a wide variety of other components and to fulfill many different roles. In addition, the preferred embodiments can cause a first component to change its functionality based on the component to which the first component is connected. This change of functionality occurs without any required input from an assembler. By creating a single component which can adopt many different roles, the overall complexity associated with program development and component assembly can be greatly reduced.

A component role fulfillment mechanism, as part of a first component, causes the first component to select or adopt one of its many prospective roles such that it will properly operate with a second component to which it has been connected. The component role fulfillment mechanism recognizes the environment in which the component is placed and selects one of the possible roles available to a given component based on the environment into which the component is introduced. The component environment is determined by the method connections made to the first component from the second component. Thus, the method connection or connections between the first and second component determine both the environment and the role the first component is in. Because one component can take on a variety of different roles depending on to which component the one component is connected, component redundancy is greatly reduced and programs can be assembled more quickly. In addition, because each component can perform a multiplicity of different functions at the same time (i.e. —the component can be both a car and a car lot), design complexity is reduced.

The foregoing and other features and advantages of the present invention will be apparent from the following more particular description of the various preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and.

BEST MODE FOR CARRYING OUT THE INVENTION

Figure 1:
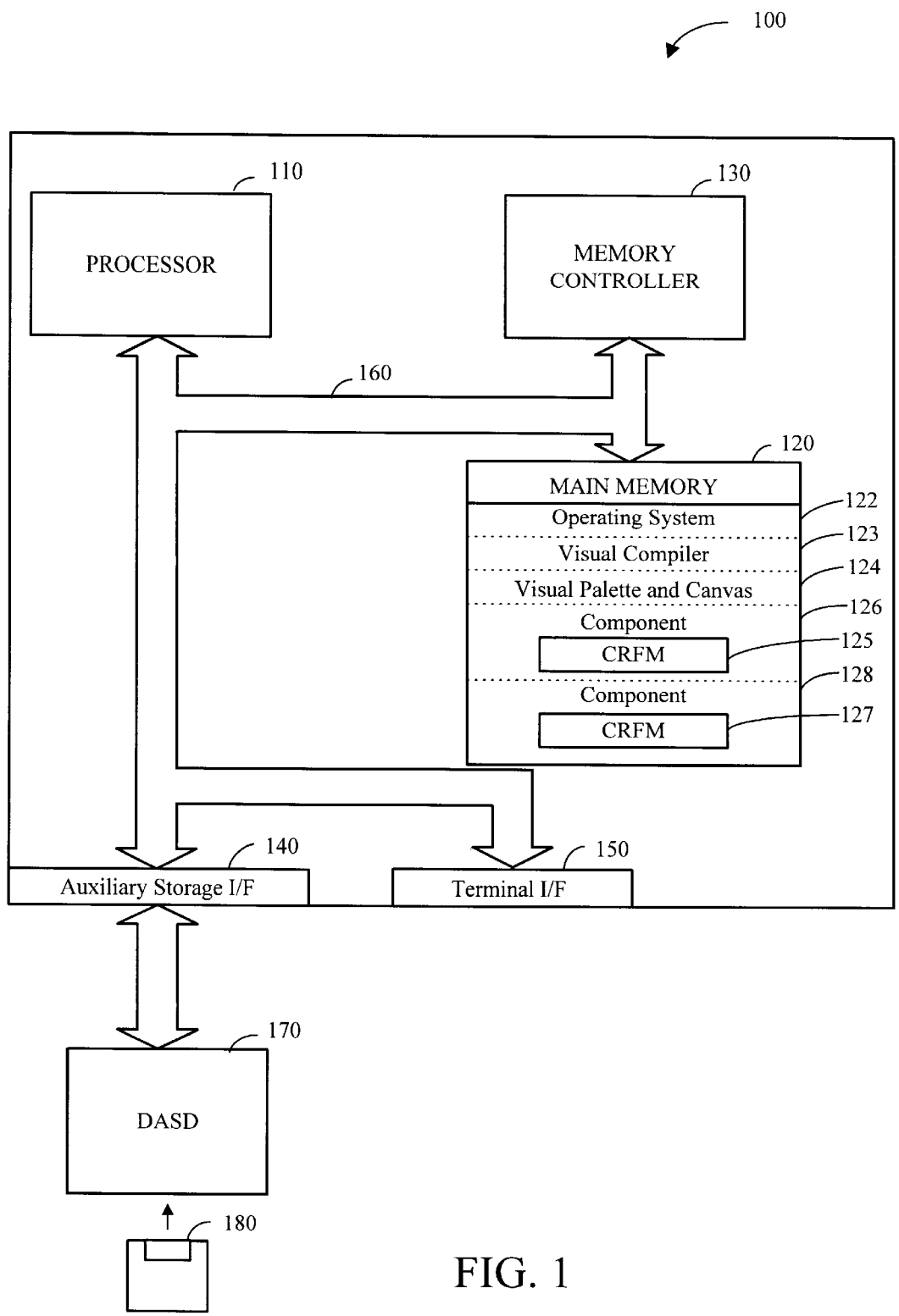
FIG. 1 is a computer system in accordance with a preferred embodiment of the present invention.

The present invention relates to the use of components, which are variants of objects in an object-oriented programming environment. For those individuals who are not generally familiar with components, the Overview section below presents many of the basic concepts and terminology that will help to understand the invention. Individuals skilled in the art of components and object-oriented programming may wish to skip this overview and proceed directly to the Detailed Description section of this specification.

1. Overview

The components presented here build on object-oriented programming, and therefore object-oriented programming will be discussed first. It should be noted that components do not require that object-oriented programming techniques be used for their creation. Object-oriented programming is a method of program implementation in which programs are organized as cooperative collections of objects, each of which represents an instance of some class, and whose classes are all members of a hierarchy of classes united via inheritance relationships.

An important concept in object-oriented programming is that classes serve as "blueprints" for objects, and objects are "instantiations" of classes. If a class is a "house" class, for example, a programmer can create two separate and distinct house objects from the house class. These two houses, House A and House B, will have all the same types of data and methods that are contained in the class blueprint. For example, both house objects will have kitchens, floors, ceilings, bathrooms, and garages. But because House A and House B are different and distinct objects, with their own object identity, the number and type of kitchens, floors, ceilings, bathrooms, and garages for each house can be different. In addition, either or both houses can be destroyed, and a program can still create or instantiate yet another house because the class—the blueprint of the house object— still exists. Even though there is this difference between classes and objects (i.e.—an object is a real entity, while a class is a blueprint for an object), the terms classes and objects will be used interchangeably because an object cannot exist without a class.

A pure object-oriented program is made up of code entities called objects. Each object is an identifiable, encapsulated piece of code and data that provides one or more services when requested by another object. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

Another important concept in the object-oriented programming environment is the concept of method calls. A method is a portion of the program that performs a particular function. For pure object-oriented programming, methods are not separate from a class or an object instantiated from the class. For instance, if HouseA is an object instantiated from the house class and HouseA has a method called "getHousePrice", then one would call the method with the statement "HouseA.getHousePrice". Thus, methods are "contained" in classes and objects. The "HouseA." part of the method call is important because it tells the compiler that the user wants the getHousePrice( ) method of HouseA only. If there is also a HouseB, the compiler needs to create the executable program or byte code (for the Java programing language) such that the program or byte code will call the correct method at runtime. This is normally done by passing a reference (or pointer) to the getHousePrice( ) method. The reference, called a "this" pointer or reference, then, clearly demarcates which object's (HouseA's or HouseB's) house price will be operated on by the getHousePrice method.

The final important concept associated with the present discussion of objects are the related concepts of hierarchies and aggregation. Hierarchies are generally based on inheritance relationships. Inheritance describes the "is a" or "IS_A" relationships between classes and objects. For instance, if there is a bird class, then a duck IS_A bird because a duck will inherit many of the properties and methods of a bird. These properties and methods include such items as feathers, beaks, claws, two legs, and two wings. But the duck also has many properties that birds in general do not have, such as the duck's particular diet, webbed feet, and ability to swim, land in water, and take off from water. Thus, the duck IS_A bird but is also different than a bird. The IS_A relationship is a one-way relationship in the sense that a duck IS_A bird, but a bird is not a duck. Birds in general do not contain the particulars that a duck has.

In addition to IS_A relationships, objects may also be related by "part of" or "PART_OF" hierarchies. PART_OF hierarchies describe aggregation relationships. An aggregate object is an object composed of other objects. For the bird example, a wing object is PART_OF a bird object. Note that a duck will inherit this PART_OF relationship because a duck will be a bird and a wing is PART_OF a bird.

Both inheritance and aggregation hierarchies may be described by levels of abstraction. For inheritance, a high-level abstraction is generalized while a low-level abstraction is specialized. Thus, a duck is a low-level abstraction because it is specialized and a bird is a high-level abstraction because it is generalized. For aggregation, a class is at a higher level of abstraction than any classes that comprise its implementation. Thus, a bird is at a higher level of abstraction than a wing is because a bird comprises a wing.

Turning now to components, components build on object-oriented programming because components generally contain objects. At the visual compiler level, a component can be as simple as one particular class of objects. An assembler, in addition to connecting components together, also generally creates many classes of objects during the creation of one program. Some of these classes are general enough to be used in other programs. An assembler, wishing to reuse these general classes over again in other projects, can create a component from the class and place the component in a component library for later recall and reuse in a different project.

Some of the more common features of components are component properties, component methods or functions, event notification mechanisms, and intercommunication. Component properties are used to define the behavior of components. Properties can be numbers, arrays, objects, and other components. Properties from different components can also be interrelated. For instance, in the car and car lot example, if a car is sold, the property on the car component that indicates whether or not the car has been sold will be changed; this change should cause the car component to update the car lot component, and the car lot component's "available cars" property, with the new information. Component methods or functions are similar to, or the same as, object functions. Finally, components can intercommunicate with one another. Intercommunication is generally performed after an "event" has happened. In the sold car example presented earlier, the selling of the car is an event that must be "passed" or communicated to the car lot component via a method call.

Although components can be as simple as a single class of objects and have simple features, components can also be considerably more complex. Several classes and their associated resources and features can be placed in a component. Components from software vendors are becoming more complex, as vendors begin to understand wiring complexities, and these complex components contain many classes, a variety of tools, and many features. For instance, IBM's San Francisco project offers assemblers a group of components called the "Business Process Components." These components are designed as frameworks that provide an object-oriented infrastructure, a consistent application programming model, and some default business logic that can be used to start building applications. The San Francisco project has three layers of reusable code for use by assemblers. The highest layer, called the Core Business Processes, provides business objects and default business logic for selected vertical domains. The second layer, called the Common Business Objects, provides definitions of commonly used business objects that can be used as the foundation for interoperability between applications. The lowest layer, called the Base, provides the infrastructure and services that are required to build industrial strength applications in a distributed, managed object, multi-platform application. The Base isolates an application from the complexities of multi-platform network technology, and frees the assembler to focus on unique elements that drive value to their customers.

To conclude, object-oriented technology can be used in constructing programs based on various components. Components can be as simple as classes of objects, but are becoming more complex all the time. Components from software vendors can be very complex and offer many features. By using components and object-oriented programming techniques, valuable business applications can be constructed and implemented to accomplish many different purposes.

2. Detailed Description

The preferred embodiments of the invention will be described in reference to examples of components introduced in the Overview section above. In particular, many of the details relating to the preferred embodiments will be described by using "beans." The most preferred embodiments of the present invention use the JAVA BEANS application programmer interface (API) that defines a portable, platform-neutral set of APIs for software components. Components designed with the JAVA BEANS API are called "beans." These JAVA BEAN components, or beans, can plug into other existing components. End assemblers will generally join various JAVA BEAN components using visual canvases or visual design tools in order to develop or create new applications.

Even though the preferred embodiment of the invention will be described with reference to beans, the invention is broadly applicable to any programming environment or language that uses objects and components. Furthermore, although the preferred embodiment will be described in terms of visual palettes and canvases and visual programming tools, the invention is equally well suited to non-visual programming tools and environments.

Finally, for purposes of this specification, the terms "mode" and "role" will be used somewhat interchangeably. This is because whenever a component changes to or adopts a particular mode, the component can fulfill only a particular role that corresponds to the selected mode. The term "mode" is a simple label for the state that the component is in, while the term "role" describes the functionality and interface of the component in that mode. In other words, the role fulfills the need of the component in that mode. Another distinction is that the mode describes the changes to the bean (the component) while the role is what function the bean has in the system. For instance, if a component is in the controller mode (to be discussed below), the component has certain methods, properties, events, and event notifications associated with it that describe a given "role" The mode is the bean or component in a state such that the bean or component fulfills the role of controller. Similarly, if the component is in the collection mode (also to be discussed below), the component has different methods, properties, events, and event notifications that are the component's role. Switching the mode allows a bean or component to fulfill another role. Thus, even though modes and roles are technically slightly different, the terms will be treated synonymously because a component cannot take on a particular role without being in a corresponding mode.

Referring now to FIG. 1, a computer system 100 in accordance with a preferred embodiment of the present invention is a computer system running a visual programming design tool. However, those skilled in the art will appreciate that the methods and apparatus of the present invention apply equally to any computer system, regardless of whether the computer system is a complicated multi-user computing apparatus or a single user device such as a personal computer or workstation. In addition, the methods and apparatus of the preferred embodiments of the present invention apply to non-visual programming tools, but the preferred embodiments will be described in relation to visual programming tools. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an operating system 122 within main memory 120. Operating system 122 can be any operating system able to run a compiler, such as Unix, Linux, OS/2, WINDOWS NT, WINDOWS 95 or 98, etc. Operating system 122 controls the basic functions of computer system 100.

Preferably running with and being controlled by operating system 122 is a visual compiler 123, a visual palette and canvas 124. Components 126 and 128 also reside in the memory and both contain component role fulfillment mechanisms (CRFMs) 125 and 127. Components 126 and 127 will generally be joined by dropping these components onto the canvas of visual palette and canvas 124. Visual compiler 123 will then compile components 126 and 128 into an executable program able to run on operating system 122. Visual compiler 123 can interact with a separate visual palette and canvas 124, as shown in FIG. 1, or visual compiler 123 and visual palette and canvas 124 can be contained in one program that has the functionality of both.

In general, only component role fulfillment mechanism 125 and component 126 will be referred to; however, it is to be understood that main memory 120 can have a multiplicity of components with each component containing their respective component role fulfillment mechanism. In addition, component role fulfillment mechanism 125 can also be used with non-visual programming tools and compilers, because the benefit of component role fulfillment mechanism 125 is really the ability for one component to take on many roles, the particular role being chosen based on the environmental context in which the component is placed. Thus, component role fulfillment mechanism 125 is really a benefit to any assembler building any program. Presently, it is believed that the best results are achieved through the use of a visual programming tool such as visual palette and canvas 124.

Figure 2:
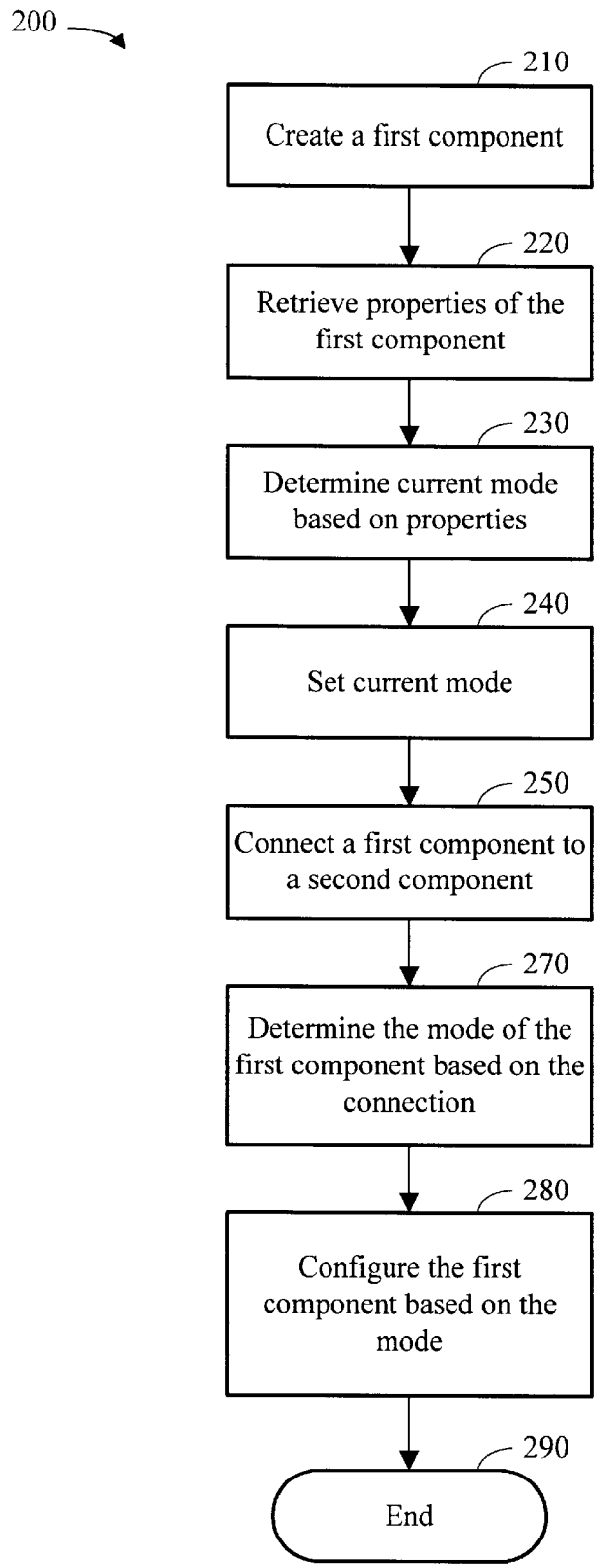
FIG. 2 shows a method for implementing a component role fulfillment based on environmental context according to a preferred embodiment of the present invention.

It is preferred that component role fulfillment mechanism 125 be part of a component 126 or component 128, as is shown in FIG. 2. Component 126, then, has all the functionality necessary to perform any of its defined roles. Component role fulfillment mechanism 125 would then act as an "intermediary" between the component and visual palette and canvas 124 to properly configure the component into the role the assembler has chosen. FIG. 1 shows this principle, where component role fulfillment mechanism 125 is contained within component 126 and acts as an intermediary between visual palette and canvas 124 and component 126 to both determine the environment in which component 126 is placed and the role component 126 will fulfill within that environment. In addition, it is possible to create a component role fulfillment mechanism 125 that is not part of a component; however, this would create unneeded complexity because the assembler would then have to connect both the component role fulfillment mechanism 125 and component 126 to another component. Adding the additional functionality of component role fulfillment mechanism 125 to a component allows the assembler to merely interact with the component and not worry about having to interact with another object such as component role fulfillment mechanism 125.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 180) and CD ROMS, and transmission type media such as digital and analog communication links, including wireless communication links.

Memory controller 130 is responsible for control signals to move, store, and retrieve requested data from main memory 120 and/or through auxiliary storage interface 140 to processor 110. While, for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

The preferred embodiments of the present invention solve the problems of code generation and complexity. The code generation problem can be mitigated or solved by having a component role fulfillment mechanism that can change a first component's interface and functions based on a connection to second component. Because the component role fulfillment mechanism causes a component to change, adapt, or "morph" so that the component can fulfill the roles of several different components, the assembler can use this single morphing component for many different purposes instead of creating a variety of new components. Thus, a single component can fulfill many different roles, based simply on the environment context in which the component is placed. The environment context can be determined, in simple terms, based on a second component to which the first component is connected and how the two components are connected. Other, more complex methods may be used to determine context as well.

The problem of interconnection and programming complexity is solved, or at least meliorated, by having a single component that can fulfill more than one role. The assembler need not connect as many components together because one component can take on several roles at the same time. This one component is capable of fulfilling various roles at the same time, leading to decreased complexity.

Returning to the car lot example presented above, the assembler needs to have several car lots, each with many cars. The car lots all report to or are owned by a dealer. Therefore, the lots need to be connected to the dealer. Previously, each car component would have to be connected to a car lot component which would then be connected to the business component. These interconnections result in a very complex program and visual environment, and the many sub-components, user interface components and interconnections between these components have even been ignored.

The present invention supercedes the existing paradigm by creating "morphing" components. As indicated above, canvases can become complex very quickly. All the assemblers really want to do is to determine that there are cars and that the cars are in placed in lots. Assemblers will become quickly overwhelmed by having a large number of cars connected to several lots. A visual canvas containing these items will quickly become undecipherable. Assemblers would prefer to drop a component called "cars" onto the canvas. If they want to deal with individual or groups of cars, they would like to interact with the cars component itself.

This need for having components that are multi-functional is solved by creating morphing components. The component "cars" defaults to the entire lot of cars when it is first placed on the canvas by the assembler and is not connected to other components. But, component role fulfillment mechanism 125 inside the component can cause the cars component to morph into a particular car or sets of cars (such as all imported cars) when the cars component is connected to another component. In fact, the cars component can represent all imports at the same time it represents a particular car from the imports. Through a process called "iteration," the component can move through the imports one at a time, representing each imported car at the same time it represents the group of imported cars.

These various ways of having the same component represent different cars or groups of cars are done through properties that the component creator has given the first component. This first component has all necessary properties, methods, events, and event handling routines to enable it to take on many roles. The component role fulfillment mechanism 125 chooses the correct properties, methods, events and event notification, for the role that the first component will fulfill, based on the which method call on the first component's interface is used to connect the two components. If the assembler lays one component onto the canvas and leaves it disconnected, the component creator will have chosen exactly how the component represents itself. The default behavior is that the component represents the entire collection, and is also able to be one particular car. The user can then iterate through the collection if the user connects the component to the main program or another component through the correct method call.

If the user wants to change the behavior of the first component, which represents all of the cars, the user will connect this component to a second component through a method call that is part of the first component's interface.

Depending on which method call on the interface of the first component the second component is "wired," the first component may adopt a different role such that the component role fulfillment mechanism has to morph the component. A role may be a single car or a group of cars.

Turning now to FIG. 2, method 200 for component role fulfillment based on environmental context is shown. Method 200 begins when a component is created (step 210). Generally, this will be accomplished by invoking some type of constructor, such as the CurrencyBean constructor that will be described with reference to FIGS. 3 and 4. However, any method whereby a component may be created is sufficient for this step. It must be understood that when component 126 is first placed on the canvas and not connected to another component, component 126 will have a default mode chosen for it and will be in that default mode because the constructor or other creation mechanism will be automatically called by visual palette and canvas 124 when component is placed on the canvass. In the visual palette and canvas 124 environment, the assembler generally does not create the component, as the component is automatically created.

Once the component is created, properties relating to the default mode of the component are retrieved by component role fulfillment mechanism 125 (step 220). Next, component role fulfillment mechanism 125 determines which mode is the default or current mode by examining these properties (step 230). Preferably, there are a list of properties, with each property or sets of properties associated with a given mode. Component role fulfillment mechanism 125 then chooses the default mode based on the properties retrieved, in this case the default mode since no other component has been connected to the first component. Component role fulfillment mechanism 125 next sets this default mode (step 240). The default mode and the properties associated with it will be described in more detail in reference to FIG. 3.

Once the current or default mode is set, the assembler then connects the first component to a second component (step 250). If this connection is never made, the first component will remain in its default mode. If the connection is made, component role fulfillment mechanism 125 determines the mode of the first component based on the connection (step 270). The type of connection, thus, defines the mode of the first object and the environment in which the first component is placed. It should be noted that the connection between the first and second object may also be used to determine the mode for the second object as well. The second object may contain its own component role fulfillment mechanism which will the set the mode of the second object based on the connection made to the first object.

There are three standard interfaces and modes defined in the most preferred embodiment of the present invention. As explained previously, each component has an interface. Because components containing a component role fulfillment mechanism 125 can support several roles, these components have interfaces for each possible role. The interfaces and the methods, properties, events, and event notification mechanisms associated with each interface define the roles of each component. The three interfaces and modes of the most preferred embodiment of the present invention are the controller interface and related mode, the business object interface and related mode, and the collection interface and related mode. The collection and controller modes allow the first component to be both a car and a car lot, but both modes have different interfaces. The controller mode is the default mode of the component. The business object mode allows a component to be a single car.

The assembler will be aware of the three standard interfaces and the respective interface's modes. The assembler can choose which mode to place the first component into by choosing which method on which interface the second component is to be connected. For instance, when the first component is placed on the canvas and the assembler connects the second component to the first component's constructor method, component role fulfillment mechanism 125 sets the first component into its default mode. The constructor method is part of the controller interface. The assembler knows what default mode the first component has when the component is created. The assembler can choose to leave the first component in its default mode or choose to change the first component into a different mode by connecting a second component to the first component through a different method call on another interface. This connection is made in step 250, and component role fulfillment mechanism 125, as part of the first component, will determine the mode of the first component based on the connection in step 270.

Once the mode is determined, component role fulfillment mechanism 125 configures the component correctly such that it can properly assume that role. Certain properties on component 126 create each configuration or mode. If a property is changed, through a connection between components, the configuration and mode of object 126 will be changed. Component role fulfillment mechanism 125 configures the component by placing the component into one of the three generic interfaces and their accompanying modes. Placing the component into a mode is done by creating a series of connections or method calls on the generic interface to change the mode of the component.

Component 126, as stated previously, already has all the methods, properties, events, and event notifications for the three interfaces that are able to take on the three roles in the preferred embodiment of the present invention. Several preferred embodiments wherein component role fulfillment mechanism 125 morphs component 126 into a different mode will be described below, but any method known to those skilled in the art that will allow a component or object to select a mode and change component 126 into that mode is applicable. For instance, component role fulfillment mechanism 125 could simply set a variable of the sort "Mode=CONTROLLER" and component 126 could use "switch" statements to operate in a particular mode; or, component role fulfillment mechanism 125 could contain a list of the different modes and the properties, methods, events, and event notifications needed for each mode, and component role fulfillment mechanism 125 could then access a particular list for the particular mode that component 126 is in and use this list corresponding to the mode to place component 126 into this mode.

This configuration step is really where component role fulfillment mechanism 125 changes the component based on the component's environment (step 280). In different environments, as defined by the connection or method call to the component, the component will take on different modes. The first component is now set to permanently take on the duties and responsibilities of its particular mode and method 200 ends (step 290).

To this point in the specification, the invention has been basically described in a very general sense in order to provide an overall context for the use and operation of the invention. The remaining portion of the disclosure provides specific implementation details for several preferred embodiments of the present invention.

Figure 3:
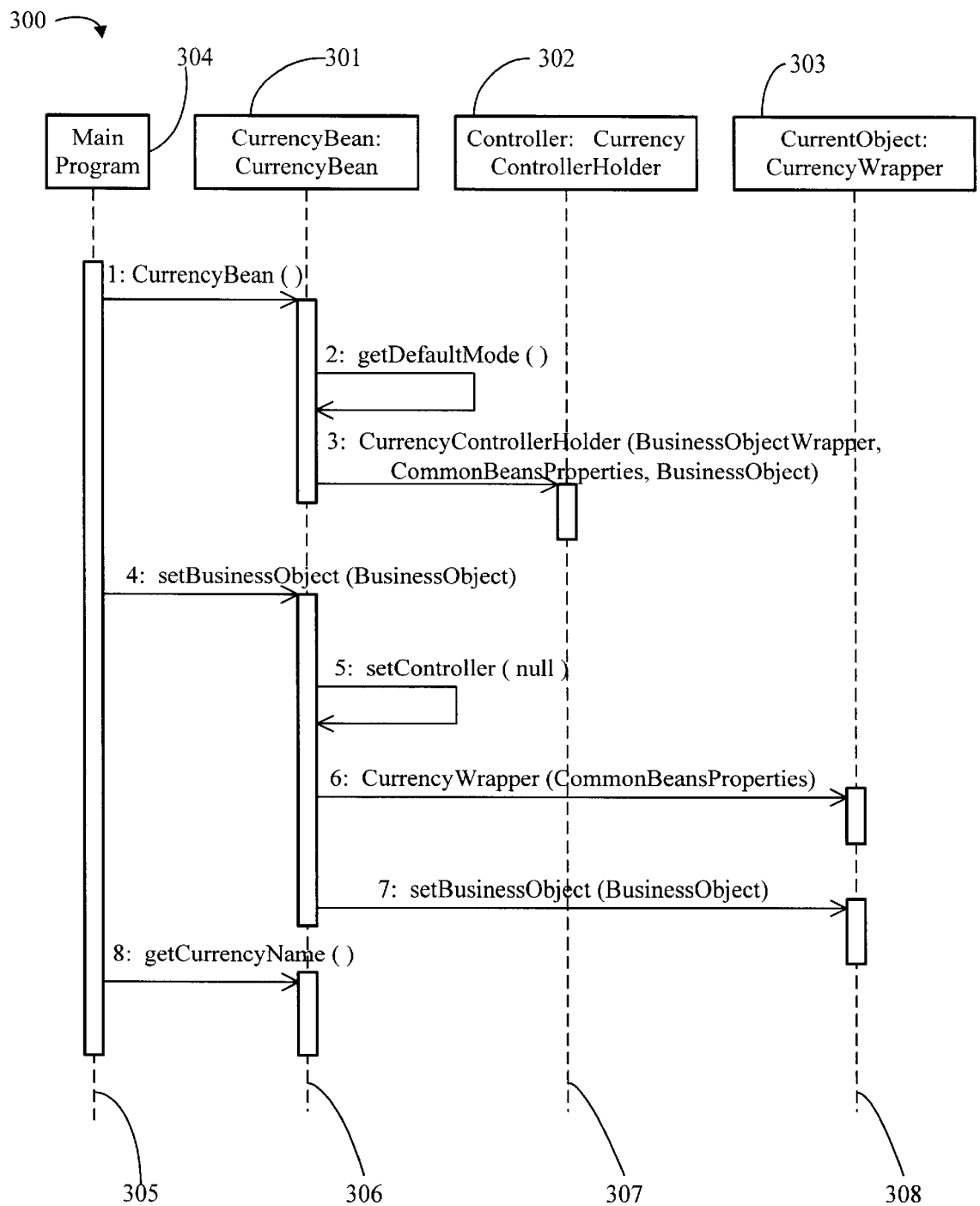
FIG. 3 is a class sequence diagram for connection of an object, wherein the object will operate in a first mode.
Figure 4:
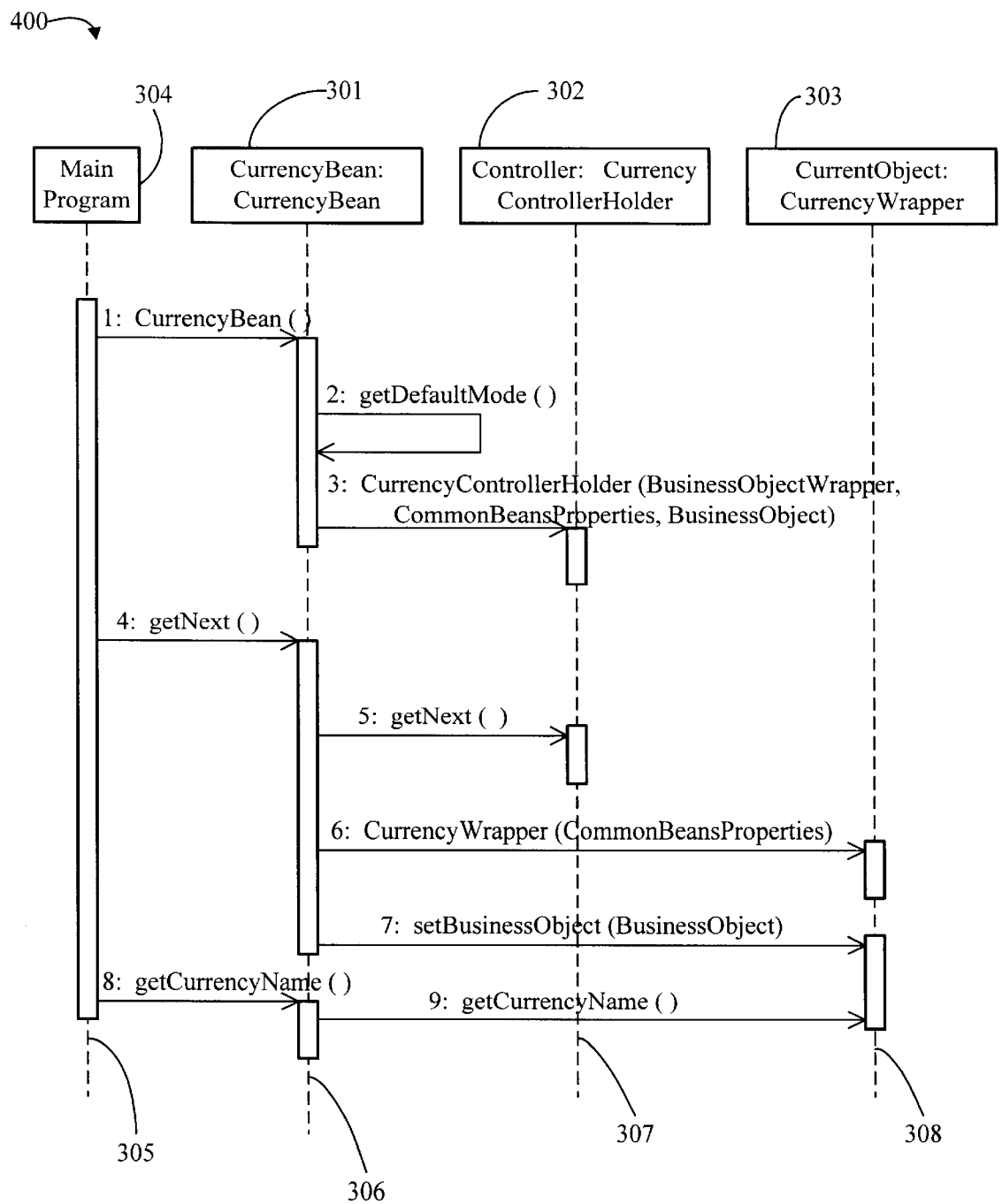
FIG. 4 is an alternative class sequence diagram for connection of the object in FIG. 3, wherein the object will operate in a second mode.

FIGS. 3 and 4 show two different ways that one object can perform different functions based on the environmental context defined by the methods interconnecting this object to another object. As previously discussed, a single object can become, and fulfill the role of, a business component, a collection component, and a controller component. In the following examples, the preferred embodiment of the invention will be described in terms of currencies and banks. It is to be understood that the class (the component) supports all modes and that a component can take on any, some, or all of the modes in the class.

Turning now to FIG. 3, a class sequence diagram for connection of an object in order for it to fulfill the business mode is shown. Business class sequence diagram 300 shows both the sequence in which methods are called and how these methods are connected. Business class sequence diagram 300 shows how the CurrencyBean class 301, CurrencyControllerHolder class 302 and the CurrencyWrapper class 303 are connected to themselves and main program 304. Extension lines 305, 306, 307, and 308 indicate that CurrencyBean class 301, CurrencyControllerHolder class 302, CurrencyWrapper class 303, and main program 304, respectively, continue down the page, but that only a portion of the possible interconnections has been shown. Extension lines 305, 306, 307, and 308 also indicate which class has which method. In this case, the CurrencyControllerHolder( ) method is a constructor method of CurrencyControllerHolder class 302.

The default mode for an object instantiated from CurrencyBean class 301 is a 'controlled' business object, meaning that objects instantiated from CurrencyBean class 301 will be controller objects, which can be both a single object and a collection of objects. However, the single object is null until setBusinessObject( ), method number four, is called, when the single object is assigned a particular object. Thus, the object instantiated from CurrencyBean class 301 is capable of being a single object in its default mode, but the object starts as a controller object.

Business class sequence diagram 300, however, shows an environment where objects instantiated from CurrencyBean class 301 are in a mode wherein each object represents a single object only, in this case a currency. A currency bean object is instantiated by the first method, CurrencyBean( ) (the constructor is called). Constructors are object-oriented methods that set data members for an object equal to particular values and perform other necessary functions in order to properly create and instantiate objects. This object, instantiated from CurrencyBean class 301, will be called the CurrencyBean object (not shown in FIG. 3).

It should be noted that the assembler has connected main program 304 to CurrencyBean class 301 through the CurrencyBean method. As such, the assembler must know the consequences of this action, i.e.—the CurrencyBean object will be in controller mode. In addition, with reference to FIG. 1, main program 304 is component 128 and CurrencyBean class 301 is component 126 with component role fulfillment mechanism 125 internal to CurrencyBean class 301. In this particular example, main program 304 does not need component role fulfillment mechanism 127 and does not contain this mechanism.

The second method, getDefaultMode( ), is part of component role fulfillment mechanism 125. Component role fulfillment mechanism 125 calls getDefaultMode( ) to receive the default mode in which the CurrencyBean object is to be placed. The default mode may be as simple as one statement, such as "DefaultMode=COLLECTION", or the default mode may be ascertained through an analysis of the properties that are set on CurrencyBean object. In the latter instance, getDefaultMode( ) would perform one or more method calls to a method that can retrieve properties of the component. Any method known to those skilled in the art that can return a property associated with a component may be used in getDefaultMode( ). A builder could query a particular class or component for getPropertyName( ), where PropertyName is the correct name of the property wishing to be checked. If getPropertyName( ) is found, the builder knows that the component has the property PropertyName on its interface. The properties returned by getDefaultMode( ) will include any default properties, such as the default property of controller mode. Component role fulfillment mechanism 125 uses these properties to decide what methods to call to put CurrencyBean object in its default mode.

It is important to note that getDefaultMode( ) need not be performed and the invention would not be curtailed in any way. Those skilled in the art will realize that the constructor itself will "know" what default mode to create, and place, the object instantiated from the class in. This step is performed by component role fulfillment mechanism 125 because it is desirable that the CurrencyBean object be placed into a known default mode before the assembler then changes the mode. In addition, it is possible that the assembler could make some erroneous connection or erroneously change a property that might affect the default mode. In order to prevent these erroneous changes from affecting the real role that the CurrencyBean object will be in after the assembler has made his or her connections to CurrencyBean class 301, component role fulfillment mechanism 125 finds the real default mode of the CurrencyBean object and places the CurrencyBean object in that mode.

Returning to FIG. 3, the third method call is made because, based on the properties retrieved, component role fulfillment mechanism 125 (not shown in FIG. 3) has determined that it was necessary to call the CurrencyControllerHolder( ) method. Component role fulfillment mechanism 125 then called the CurrencyControllerHolder( ) method because the CurrencyBean is in controller mode, as determined based on the properties retrieved by getDefaultMode( ). The properties received, if more than one actual property as described above, through getDefaultMode( ) are compared against lists of potential properties, each list of properties being associated with a mode. The constructor, in the simple case being outlined, has set the properties for the CurrencyBean object that the constructor has created. Should a different constructor be called, then different properties may be set by this different constructor. Component role fulfillment mechanism 125 will then have a different set of properties returned through this process. This different set of properties will be compared against the lists of potential properties until a match is found and the mode for that match retrieved.

In the case of FIG. 3, the properties associated with the controller mode were returned by getDefaultMode( ), and component role fulfillment mechanism. 125 uses these properties to search the lists of properties until a match indicating controller mode was found. If no matches are found, component role fulfillment mechanism 125 will be unable to configure the component to automatically fulfill its role and the assembler must completely set up the component to correctly fulfill its role.

In the example of FIG. 3, however, component role fulfillment mechanism 125 will know that CurrencyBean object is in controller mode and will set CurrencyBean object as a controller object. To set CurrencyBean object as a controller, component role fulfillment mechanism 125 calls the CurrencyControllerHolder( ) method. The CurrencyControllerHolder( ) method creates the controller holder, which contains the controller object. Holders and wrappers will be described in greater detail with reference to FIG. 5. Holders and wrappers are similar in that both contain or "wrap", respectively, a component or object in an interface that is recognizable as that particular component or object. This interface has the extra methods and properties already set to enable the controller holder object to fulfill its current role. The holder and wrapper, then, are the object's interface with the outside world: all messages travel to and from the holder, wrapper, and the object or component. However, the BusinessObject parameter is not used. CurrencyControllerHolder( ) can then hold the CurrencyBean object in a controller holder. Thus, the CurrencyBean object is now a controller holder.

After CurrencyBean object has been instantiated and it is in controller mode (its default mode), control returns to main program 304. Assemblers then have access to several methods more methods that will automatically change the mode of the bean. In this example, the mode can be changed by directly setting the business mode. The assembler wires main program 304 to the CurrencyBean object by using the setBusinessObject( ) method on the CurrencyBean object's interface, as shown in FIG. 3. This causes a sequence of events, the end result of which forces the CurrencyBean object to be in the business mode. The CurrencyBean object (currently a controller object) is morphed into a business object. The method setBusinessObject( ) defines that the already instantiated object will be only one object or currency, which is termed a business object. The instantiated object will not be a compendium of objects—a controller object or a collection object. Note that the assembler has explicitly made the setBusinessObject connection between main program 304 and CurrencyBean class 301. The assembler, thus, has control over the mode of CurrencyBean object, because the method call the assembler chooses to connect to CurrencyBean class 301 determines the mode of the CurrencyBean object.

Once the assembler has connected main program 304 to CurrencyBean class 301 through the setBusinessObject( ) method, component role fulfillment mechanism 125 runs method five, setController( ), to disable the controller mode. Disabling the controller is preferably done by changing the mode and placing a null (or removing the reference) to the controller. Now the currency bean object can only fulfill the role of one object—a currency—and it cannot fulfill the role of more than one object or of a collection. CurrencyBean object has begun to morph into an object supporting a particular mode.

Once the controller mode of the component is disabled, component role fulfillment mechanism 125 still needs to set up a currency wrapper for the business object that has been passed to it by setBusinessObject( ). Wrappers and holders, again, will be discussed in more detail with reference to FIG. 5. Component role fulfillment mechanism 125 calls method number six, CurrencyWrapper( ), to create the currency wrapper for the CurrencyBean object. The setBusinessObject( ) method, method seven, sets the currency object into a wrapper using a method from CurrencyWrapper class 303. Note that the computer language being used for this example allows methods to be overridden (or overloaded), but this functionality is not necessary to the invention.

Finally, method eight, getCurrencyName( ), delegates directly to the single business object mode of the bean. Delegation means that all future property requests will be forwarded to the CurrencyBean object and that the wrapper that contains the object is the object's interface with the outside world. Other objects interact with the wrapper and the object wrapped in the wrapper actually does all the real "work." Thus, the CurrencyBean object is now completely fixed in the single business mode.

Turning now to FIG. 4, FIG. 4 shows a class sequence diagram for hookup of an object in order for it to fulfill the controller mode. In the controller mode, the object is both a collection of objects and a single object. Controller class sequence diagram 400 shows the interconnection between the same classes as shown in business class sequence diagram 300 (e.g.—CurrencyBean class 301, CurrencyControllerHolder class 302, CurrencyWrapper class 303, and main program 304). However, now a currency bean object instantiated from CurrencyBean class 301 fulfills a different role, the role of a controller object. The object instantiated from CurrencyBean class 310 will again be called a CurrencyBean object. The methods being connected and executed between the various classes are different.

All of the first three methods are the same, yielding a currency bean object that is in its default mode of controller mode. Also, the single object of the bean is null until getNext( ), method four, is called. Now, however, the assembler attaches CurrencyBean class 301 to main program 304 by using the getNext( ) method, method four. This method starts the process down a different path. This method allows the assembler to select a particular object out of the collection of object. The getNext( ) method is delegated to the controller holder by the bean. This means that the bean asks the controller holder to fulfill the needs of getNext( ), and the controller holder then delegates to the holder. The next getNext( ) method run by component role fulfillment mechanism 125, method five, retrieves an object from the controller mode of the bean, CurrencyControllerHolder class 302. At this point, the component, the CurrencyBean object, is in both the controller business object mode and the single business object mode, such that the object can be both one object and a collection of objects.

Then the sixth method, CurrencyWrapper( ), is run to create a new wrapper for the business object. The setBusinessObject( ) method then sets the business object. Basically, the setBusinessObject( ) provides the object to which all requests will be delegated. The CurrencyBean object is now both a particular object (a currency) and a group of objects (many currencies). The morphing of the object into an object that has the modes of an object and a group of objects is complete.

Finally, the getCurrencyName( ) method delegates directly to the single business object mode of the bean that was retrieved by the getNext( ) method. Note that now, because the Currency object is in controller mode, the Currency object can iterate through individual objects by calling getNext( ) to get another object. This is unlike the prior business object mode, wherein the Currency object was only one object and could not be another object (without changing modes).

It must be understood that the environmental context in which a component is placed defines the mode of the component. The default mode is independent of the environmental context, as the component should be placed in its default mode regardless of the environmental context. The assembler controls the environmental context by connecting main program 304 to particular methods on CurrencyBean class 301. For instance, in FIG. 3, the assembler connected main program 304 to CurrencyBean class 301 through the setBusinessObject( ) method; this connection caused the component to become solely a business object. In FIG. 4, the assembler connected main program 304 to CurrencyBean class 301 through the getNext( ) method; this connection caused the component to become a controller object that had a particular object loaded and had the ability to iterate through objects. The methods, as described in reference to FIGS. 3 and 4, define the mode of the component. The methods also define the environmental context because it is really the methods that determine the environment. In addition, in the preferred embodiment of the invention, component role fulfillment mechanism 125 is added functionality in CurrencyBean class 301. CurrencyBean class 301 has all the functionality inherent in it to fulfill all modes. Component role fulfillment mechanism 125 acts to change the component's role based on the environmental context, which is based on the method call or calls to CurrencyBean class 301.

Figure 5:
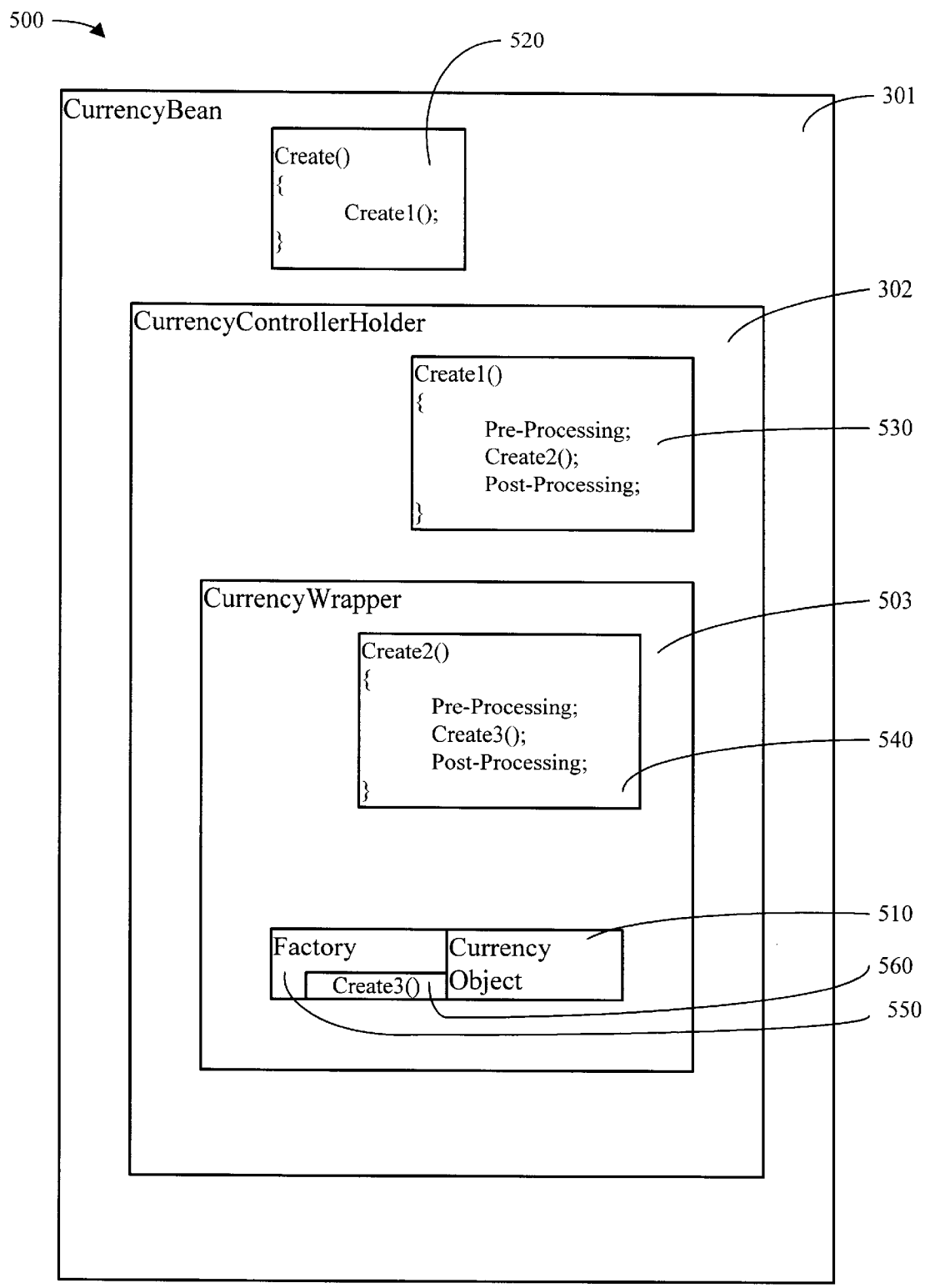
FIG. 5 shows a layer diagram with specific reference to holders and wrappers for the controller mode in accordance with a preferred embodiment of the invention.

Turning now to FIG. 5, holders and wrappers will be more specifically explained. Holders and wrappers are not necessary to the practice of the current invention, but are used in the preferred embodiment of the present invention because of the unusual programming language and environment in which the components are placed. The interfaces of this programming language and environment require that certain layers be added between the bean and the object. In particular, the JAVA BEANS API (application programmer interface) has a strict structure that beans must follow. Should a component designer choose not to follow this rigid paradigm, then the component designer will need to provide some sort of buffer between the bean and the object in its mode. Should a programmer choose another API and another component scheme, the component and object model will be much simpler. This simplification would make layers unnecessary, and those skilled in the art will readily see that normal inheritance and/or aggregation schemes may be used to provide for one component that can fulfill several roles. In addition, a person skilled in the art who chooses to perform the present invention with these layers may also expand the roles to add more layers. These new layers could add more functionality (e.g., context) such as location over a network or network naming space.

Returning now to FIG. 5, controller layer diagram 500 of FIG. 5 shows Currency object 510 fulfilling the role of a controller. Controller layer diagram 500 shows how holders and wrappers are placed around Currency object 510 and how many levels or layers there are between Currency object 510 and CurrencyBean class 301.

Holders are used to create context for the wrapper that underlies the holder. Basically, a controller component needs to act like both a controller and a single object or component. In other words, a car lot must also be a particular car. But a car and a car lot have many differences, and a layer is used to "hold" the particular car so that it looks from the "outside" like it is a controller and a bean and not a particular object. Holders are used to adapt a particular data structure to another data structure. The uppermost data structure, the data structure the other components deal with, is the context. The holder is generally a collection and the wrapper is generally singular (one object). The holder takes care of coordinating the changes and lookups in the collection or controller. In other words, if the component is in controller mode and the user or assembler is iterating through objects (cars), the holder coordinates looking up the object, adding the object to the interface, and filing the former object. Holders also allow pre- and post-processing, which will be described below. If a currency is contained in a controller, then the wrapper underlying the holder needs to 'exist' in the context of a controller holder. The holder is generally necessary to provide the context that a wrapper is in.

Wrappers, on the other hand, are used for several different reasons. Wrappers such as CurrencyWrapper class 303 have a one-to-one mapping to a business object. A wrapper exposes all of the properties of a class and delegates to the business object when a property is requested. The wrapper represents a single object within a collection. The JAVA BEAN API is very specific for many parts of its interface. For instance, the API requires "set" and "get" methods. So, if a user has a property called PropertyA, then there must be at least two methods associated with this property, getPropertyA( ) and setPropertyA( ). In addition, the event model is particular to JAVA BEANS. So, a preferred embodiment creates another layer that acts as an intermediary between the JAVA BEAN (or simply "bean") and the object. This layer is basically a translation layer between the bean (with its rigorous JAVA BEAN API) and a component/ object made by a developer. JAVA BEANS allow generic interfaces to be developed and quickly implemented. But with these generic interfaces come a price—anything not supported by the generic interface must still be implemented but the JAVA BEAN API might not have a direct method of doing the particular implementation. Thus, the implementation is performed at a lower level and the upper level is "tricked" into operating as if the lower level has performed this implementation in the manner allowed by the upper level.

Holders and wrappers generally use aggregation to hold or contain another object. The holder determines the context and the wrapper wraps an object in that context. This is shown in controller layer diagram 500, where CurrencyBean object 410 is wrapped by CurrencyWrapper class 303 and placed in a holder by CurrencyControllerHolder class 302. Other components (or main program 304) interact with the CurrencyBean class 301. Massages, events, and method calls get delegated through the layers to CurrencyObject 510. Thus, from an "outside" object's perspective, the outside object thinks that it is dealing with an object instantiated from CurrencyBean class 301, when it is really dealing with several layers of objects until morphed Currency object 510 is contacted.

Although holders and wrappers generally use aggregation to hold or wrap, respectively, a component, FIG. 5 should not be interpreted as an aggregation diagram. FIG. 5 shows the layers or the logical depiction necessary to transfer and delegate a method call from a bean to an actual object or component. Assuming that the currency bean is already in controller mode, FIG. 5 shows the situation where the assembler desires to create another currency object. If CurrencyBean class 301 is in the controller mode, the bean will create an object and add this object to its list of objects. If CurrencyBean class 301 is in the single business mode, the bean will create a new object but will replace the old object, since the bean can only be one object.

As an example, assume that CurrencyBean class 301 has a Create( ) method 520. The assembler calls the Create( ) method by connecting a line from main program 304 to Create( ) method 520 on CurrencyBean class 301. This method call delegates downward through the layers. The way this particular method call delegates downward through the layers is by having Create( ) method 520 call Create1( ) method 530, a method of CurrencyControllerHolder class 302. Create1( ) method 530 also delegates the creation of the currency object to a lower layer by calling Create2( ) method 540. Before it does this, however, pre-processing is performed. In addition, after Create1( ) method 530 has been called, post-processing is performed. Pre- and post-processing occur because the bean, as stated above, generally require context and these steps allow the context to take place.

In this specific instance, the pre-processing step comprises starting a transaction, the transaction indicating that a serious of small operations are about to occur. The transaction is registered because this ensures that the small operations are completed all at one time by the program, even though actually completed at numerous times. All operations are "gathered" and finally completed in one step when the transaction is committed. This prevents failed operations from changing the result of the series of operations. For instance, if a person asks to withdraw money from a savings account and deposit this money into a checking account, a transaction would start as soon as the person asked to withdraw money. The transaction, made of two operations, would be committed when the person asked to deposit the money into the checking account. When the transaction is committed, both operations—withdrawing the money and depositing the money—are completed at the same time. If it were not for this precaution, the money could be withdrawn, but the deposit could fail. If the deposit failed, then the withdrawn money would be in an unknown state because the money has nowhere to go. Submitting a transaction then committing the transaction prevents this from happening.

After control returns from Create2( ) method 540, Create1( ) method 530 performs post-processing by committing the transaction. In addition, if CurrencyBean class 301 is in controller mode, then Create1( ) method 530 will add the new CurrencyObject 510 to the current collection of currency objects. If CurrencyBean class 301 is in the single business mode, then Create1( ) method 530 will change the previous CurrencyObject 510, replacing it with the new CurrencyObject 510.

Create2( ) method 540, as a method in CurrencyWrapper class 302, delegates this method call yet again by calling Create3( ) method 560. Again there is pre- and post-processing before and after, respectively, the call to Create3( ) method 560. The pre-processing at this stage checks to ensure that the transaction is active; if the transaction is not active, Create2( ) method 540 will start the transaction. The post-processing step commits the transaction if the pre-processing step of Create2( ) method 540 started the transaction.

Finally, Create3( ) method 560 creates another CurrencyObject 510. Create3( ) method 560 is part of factory 550. Factory 550 creates new instances of CurrencyObject 510. Normally, method calls, events, and messages would be delegated directly down to CurrencyObject 510. For the particular case where a new currency object is to be created, there is no object to delegate down to; thus, factory 550 must create an object. It must be understood that method calls and event routing to CurrencyObject 510 will generally go through these layers and have pre- and/or post-processing at each layer.

To conclude, the unique paradigms employed by the current invention cause this unusual structure. The requirements of the particular component paradigm being used coupled with the strict nature of the JAVA BEANS API require delegation through layers from a bean to an object. Those skilled in the art will realize that it is entirely possible to create an object that can fulfill several different roles and that contains a component role fulfillment mechanism 125 using, for example, simple inheritance and aggregation.

While the previous discussions have mainly considered the simple examples of an object instantiated from a class, it should be understood that the preferred embodiments of the present invention generally involve components having much greater complexity. Such components could be created using a multitude of classes, methods, and data for those classes. For instance, the component described in FIG. 5 starts as a bean, created with the JAVA BEANS API, passes through several layers that may have inheritance and/or aggregation, and ends with lower-level component CurrencyObject 510. Thus, the component shown as CurrencyBean class 301 in FIG. 5 is made of a multiplicity of components having a variety of inheritance and aggregation structures. In addition, the components could contain other object-oriented relationship contexts or increased number of modes based on state.

As shown in the previous examples, the preferred embodiments of the present invention describe a component role fulfillment mechanism 125 that can configure or morph components based on those component's environmental context. Component role fulfillment mechanism 125 is really an addition to a component that chooses between the available mode that the component can support and places the component in a particular mode based on the component's environment. This component role fulfillment mechanism 125 is a tremendous help to assemblers because the assemblers do not have to dissect a component's interface to figure out how to properly connect a component to other components on the assembler's canvas. Because one component can take on a variety of different functions depending on to which component the one component is connected, redundancy is greatly reduced and programs can be assembled faster. In addition, because each component can perform a multiplicity of different functions at the same time, design complexity is reduced.

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   a plurality of components residing in the memory, a first component of the plurality of components comprising a first plurality of modes, each mode of the first plurality of modes denoting a state of the first component, said each mode of the first plurality of modes having a role for performing a function that is specific to said each mode of the first plurality of modes; and
   a first component role fulfillment mechanism residing in the first component, the first component role fulfillment mechanism selecting one mode of the first plurality of modes for the first component.

2. The apparatus of claim 1 wherein the first component role fulfillment mechanism places the first component into the one mode.

3. The apparatus of claim 1 wherein the first component role fulfillment mechanism selects the one mode based on an environmental context relating to the first component.

4. The apparatus of claim 3 wherein the environmental context comprises an existing connection between the first component and a second component of the plurality of components.

5. The apparatus of claim 4 wherein the existing connection comprises a method call to the first component.

6. The apparatus of claim 4 wherein the first component role fulfillment mechanism selects a default mode of the first plurality of modes based on a second existing connection between the first component and the second component.

7. The apparatus of claim 6 wherein the first component role fulfillment mechanism places the first component into the default mode.

8. The apparatus of claim 1 wherein each component of the plurality of components is a JAVA BEAN component.

9. The apparatus of claim 1 wherein the at first component comprises a holder and a wrapper, wherein the holder provides context for the wrapper.

10. The apparatus of claim 9 wherein the first component is a lower-level component and wherein the wrapper acts as a translation layer between the lower-level component and the holder.

11. The apparatus of claim 1 wherein a second component of the plurality of components comprises a second plurality of modes, each mode of the second plurality of modes denoting a state of the second component, said each mode of the second plurality of modes having a role for performing a function that is specific to said each mode of the second plurality of modes, said apparatus further comprising:
    a second component role fulfillment mechanism residing in the second component, the second component role fulfillment mechanism selecting one mode of the second plurality of modes for the second component.

12. The apparatus of claim 1 wherein each role of each mode of the first plurality of modes is determined by a generic interface, the generic interface comprising a plurality of methods, properties, events, and event notifications.

13. An apparatus comprising:
    at least one processor;
    a memory coupled to the at least one processor;
    a plurality of components residing in the memory, a first component of the plurality of components comprising a first plurality of modes, each mode of the first plurality of modes denoting a state of the first component, said each mode of the first plurality of modes having a role for performing a function that is specific to said each mode of the first plurality of modes; and
    a first component role fulfillment mechanism residing in the first component, the first component role fulfillment mechanism selecting one mode of the first plurality of modes for the first component and placing the at first component into that one mode.

14. The apparatus of claim 13 wherein the first component role fulfillment mechanism selects the one mode based on an environmental context relating to the first component.

15. The apparatus of claim 14 wherein the environmental context comprises an existing connection between the first component and a second component of the plurality of components.

16. The apparatus of claim 15 wherein the existing connection comprises a method call to the first component.

17. The apparatus of claim 15 wherein the first component role fulfillment mechanism selects a default mode of the first plurality of modes based on a second existing connection between the first component and the second component.

18. The apparatus of claim 17 wherein the first component role fulfillment mechanism places the first component into the default mode.

19. The apparatus of claim 13 wherein each component of the plurality of components is a JAVA BEAN component.

20. The apparatus of claim 13 wherein the first component comprises a holder and a wrapper, wherein the holder provides context for the wrapper.

21. The apparatus of claim 20 wherein the first component is a lower-level component and wherein the wrapper acts as a translation layer between the lower-level component and the wrapper.

22. The apparatus of claim 13 wherein a second component of the plurality of components comprises a second plurality of modes, each mode of the second plurality of modes denoting a state of the second component, said each mode of the second plurality of modes having a role for performing a function that is specific to said each mode of the second plurality of modes, said apparatus further comprising:
    a second component role fulfillment mechanism residing in the second component, the second component role fulfillment mechanism selecting one mode of the second plurality of modes for the second component.

23. The apparatus of claim 13 wherein each role of each mode of the first plurality of modes is determined by a generic interface having methods, properties, events, and event notifications.

24. An apparatus comprising:
    at least one processor;
    a memory coupled to the at least one processor;
    a plurality of components residing in the memory, a first component of the plurality of components comprising a first plurality of modes, each mode of the first plurality of modes denoting a state of the first component, said each mode of the first plurality of modes having a role for performing a function that is specific to said each mode of the first plurality of modes; and
    a first component role fulfillment mechanism residing in the first component, the first component role fulfillment mechanism selecting one mode of the first plurality of modes based on an existing connection between the first component and a second component of the plurality of components, the first component role fulfillment mechanism placing the first component into the selected mode.

25. The apparatus of claim 24 wherein each component of the plurality of components is a JAVA BEAN component.

26. The apparatus of claim 24 wherein the first component comprises a holder and a wrapper, wherein the holder provides context for the wrapper.

27. The apparatus of claim 24 wherein a second component of the plurality of components comprises a second plurality of modes, each mode of the second plurality of modes denoting a state of the second component, said each mode of the second plurality of modes having a role for performing a function that is specific to said each mode of the second plurality of modes, said apparatus further comprising:
    a second component role fulfillment mechanism residing in the second component, the second component role fulfillment mechanism selecting one mode of the second plurality of modes for the second component.

28. The apparatus of claim 26 wherein the first component is a lower-level component and wherein the wrapper acts as a translation layer between the lower-level component and the holder.

29. The apparatus of claim 24 wherein the existing connection comprises a method call to the first component.

30. The apparatus of claim 24 wherein each role of each mode of the first plurality of modes is determined by a generic interface having methods, properties, events, and event notifications.

31. The apparatus of claim 24 wherein the first component role fulfillment mechanism selects a default mode of the first plurality of modes based on a second existing connection between the.first component and the second component.

32. The apparatus of claim 31 wherein the first component role fulfillment mechanism places the first component into the default mode.

33. A program product comprising:
  a first component role fulfillment mechanism residing in a first component of a plurality of components, the first component role fulfillment mechanism selecting one mode of a first plurality of modes for the first component, each mode of the first plurality of modes denoting a state of the first component, said each mode of the first plurality of modes having a role for performing a function that is specific to said each mode of the first plurality of modes; and
  signal bearing media bearing the first component role fulfillment mechanism.

34. The program product of claim 33 wherein the signal bearing media includes transmission media.

35. The program product of claim 33 wherein the signal bearing media includes recordable media.

36. The program product of claim 33 wherein the first component role fulfillment mechanism places the first component into the one mode.

37. The apparatus of claim 33 wherein the first component role fulfillment mechanism selects the one mode based on an environmental context relating to the first component.

38. The program product of claim 37 wherein the environmental context comprises an existing connection between the first component and a second component of the plurality of components.

39. The program product of claim 38 wherein the existing connection is a method call to the first component.

40. The program product of claim 38 wherein there is a second existing connection between the first component and the a second component, wherein the first component role fulfillment mechanism selects a default mode of the first plurality of modes for the first component based on the second existing connection.

41. The program product of claim 40 wherein the first component role fulfillment mechanism places the first component into the default mode.

42. The program product of claim 33 wherein the at least one component comprises a holder and a wrapper, wherein the holder provides context for the wrapper.

43. The program product of claim 42 wherein the first component is a lower-level component and wherein the wrapper acts as a translation layer between the lower-level component and the holder.

44. The program product of claim 33 wherein a second component of the plurality of components comprises a second plurality of modes, each mode of the second plurality of modes denoting a state of the second component, said each mode of the second plurality of modes having a role for performing a function that is specific to said each mode of the second plurality of modes, said apparatus further comprising:
  a second component role fulfillment mechanism residing in the second component, the second component role fulfillment mechanism selecting one mode of the second plurality of modes for the second component, the signal bearing media further bearing the second component role fulfillment mechanism.

45. The program product of claim 33 wherein each role of each mode of the first plurality of modes is determined by a generic interface having methods, properties, events, and event notifications.

46. The program product of claim 33 wherein each component of the plurality of components is a JAVA BEAN component.

47. A program product comprising:
  a first component role fulfillment mechanism residing in a first component of a plurality of components, the first component role fulfillment mechanism selecting one mode of a first plurality of modes for the first component based on an existing connection between the first component and a second component of the plurality of components, the first component role fulfillment mechanism placing the first component into the one mode, each mode of the first plurality of modes denoting a state of the first component, said each mode of the first plurality of modes having a role for performing a function that is specific to said each mode of the first plurality of modes; and
  signal bearing media bearing the first component role fulfillment mechanism.

48. The program product of claim 47 wherein the signal bearing media includes transmission media.

49. The program product of claim 47 wherein the signal bearing media includes recordable media.

50. The program product of claim 47 wherein the existing connection comprises a method call to the first component.

51. The program product of claim 47 wherein the at least one component comprises a holder and a wrapper, wherein the holder provides context for the wrapper.

52. The program product of claim 51 wherein the first component is a lower-level component and wherein the wrapper acts as a translation layer between the lower-level component and the holder.

53. The program product of claim 47 wherein a second component of the plurality of components comprises a second plurality of modes, each mode of the second plurality of modes denoting a state of the second component, said each mode of the second plurality of modes having a role for performing a function that is specific to said each mode of the second plurality of modes, said apparatus further comprising:
  a second component role fulfillment mechanism residing in the second component, the second component role fulfillment mechanism selecting one mode of the second plurality of modes for the second component, the signal bearing media further bearing the second component role fulfillment mechanism.

54. The program product of claim 47 wherein each role of each mode of the first plurality of modes is determined by a generic interface having methods, properties, events, and event notifications.

55. The program product of claim 47 wherein there is a second existing connection between the first component and the second component, wherein the first component role fulfillment mechanism places the first component into a default mode of the plurality of modes based on the second existing connection.

56. The program product of claim 47 wherein each component of the plurality of components is a JAVA BEAN component.

* * * * *